(12) United States Patent
Reischmann

(10) Patent No.: US 10,349,668 B2
(45) Date of Patent: Jul. 16, 2019

(54) POPCORN MAKER

(71) Applicant: Michael Reischmann, Eustis, FL (US)

(72) Inventor: Michael Reischmann, Eustis, FL (US)

(73) Assignee: Kenyon Technologies, LLC, Key Largo, FL (US)

( * ) Notice: Subject to any disclaimer, the term of this patent is extended or adjusted under 35 U.S.C. 154(b) by 0 days.

(21) Appl. No.: 15/192,573

(22) Filed: Jun. 24, 2016

(65) Prior Publication Data

US 2016/0374377 A1    Dec. 29, 2016

Related U.S. Application Data

(60) Provisional application No. 62/184,534, filed on Jun. 25, 2015.

(51) Int. Cl.
*A23L 7/187* (2016.01)

(52) U.S. Cl.
CPC .................... *A23L 7/187* (2016.08)

(58) Field of Classification Search
CPC ........ A23L 1/1812; A23L 1/1815; A23L 7/10; A23L 7/161; A23L 7/174; A23L 7/183; A23L 7/187
USPC .............................................. 99/323.4–323.9
See application file for complete search history.

(56) References Cited

U.S. PATENT DOCUMENTS

| | | | |
|---|---|---|---|
| 4,120,236 A * | 10/1978 | Blomberg | A23L 7/183 |
| | | | 99/323.11 |
| 4,158,760 A | 6/1979 | Bowen et al. | |
| 4,724,290 A | 2/1988 | Campbell | |
| 4,746,060 A | 5/1988 | Morehouse | |
| 4,763,567 A | 8/1988 | Dalquist, III et al. | |
| 4,902,520 A | 2/1990 | Dysarz | |
| 4,947,740 A | 8/1990 | Strawser et al. | |
| 5,045,659 A | 9/1991 | Wolfe et al. | |
| 5,163,357 A | 11/1992 | Felknor et al. | |
| 5,215,196 A | 6/1993 | Valls | |
| 5,555,792 A | 9/1996 | Stein et al. | |
| 5,928,550 A | 7/1999 | Weiss | |
| 6,187,353 B1 | 2/2001 | Wyman et al. | |
| 6,927,366 B2 * | 8/2005 | Sawhney | A47J 37/105 |
| | | | 219/429 |
| 7,432,479 B2 | 10/2008 | Avendano et al. | |
| 8,344,296 B2 | 1/2013 | Metz et al. | |
| 8,479,640 B2 | 7/2013 | Gavillet et al. | |
| 8,993,946 B2 | 3/2015 | Jacobsen et al. | |
| 9,084,504 B2 | 7/2015 | Reischmann | |
| 2006/0249031 A1 * | 11/2006 | Long | A23L 7/187 |
| | | | 99/323.5 |

(Continued)

*Primary Examiner* — Dana Ross
*Assistant Examiner* — Brandon T Harvey
(74) *Attorney, Agent, or Firm* — St. Onge Steward Johnston & Reens, LLC

(57) ABSTRACT

A system for popping popcorn includes a housing, a container positioned in the housing, a cartridge containing unpopped popcorn kernels removably supported in the container, wherein the cartridge includes ferromagnetic material, a coil that creates an oscillating magnetic field that interacts with the ferromagnetic layer of the cartridge and generates an amount of heat in the cartridge, a vibrator coupled to the container for vibrating the container and the cartridge, and a receiving vessel for receiving popped popcorn positioned adjacent the container.

21 Claims, 15 Drawing Sheets

(56) References Cited

U.S. PATENT DOCUMENTS

| | | | |
|---|---|---|---|
| 2008/0295701 A1* | 12/2008 | Richter | A47J 27/004 |
| | | | 99/323.5 |
| 2012/0111854 A1 | 5/2012 | Gaspard | |
| 2012/0152932 A1* | 6/2012 | Moon | H05B 6/062 |
| | | | 219/601 |
| 2013/0105468 A1* | 5/2013 | Reischmann | A47J 27/00 |
| | | | 219/621 |
| 2013/0156899 A1 | 6/2013 | Quinn et al. | |
| 2013/0240505 A1 | 9/2013 | Moon et al. | |
| 2015/0257419 A1* | 9/2015 | Mastroianni | A23L 7/183 |
| | | | 99/323.11 |

* cited by examiner

Popping Only Unit

Popcorn supplied in single serving packets which contain an exact amount of popcorn, oil, and any flavorings
Unit uses magnetic induction to heat a cooking tray that contains a magnetic stainless surface
Unit software algorithm preprogrammed with ideal power, time curve, and vibration levels to optimally pop the single serving package
Unit contains a litz wire coil that is driven at frequencies between 19KHz and 59KHz
We measure input voltage and current and adjust coil drive frequency to obtain desired power level
The power follows a precise curve over the cooking period to create optimum popping
The vibration level is optimized to help evenly heat the kernels (vibration could be through motor, voice coil actuator, etc.)

User Experience
Open cover on popper
Empty contents of single serving packet into popping tray
Close cover
Press power button
Wait until display signals popping complete
Open cover and remove bowl now filled with popcorn
Repeat as desired
Remove popping tray for cleaning when necessary and replace

Advanced Unit

Food is supplied in single serving containers
Each type of food has an ID which can be read
The unit reads the ID which tells the machine what algorithm to use (power levels, cooking time, and vibration level desired.)
Unit uses magnetic induction to heat a cooking tray that contains a magnetic stainless surface
Unit contains a litz wire coil that is driven at frequencies between 19KHz and 59KHz
We measure input voltage and current and adjust coil drive to desired power level
The power level follows a precise level over the cooking period to create optimum cooking
The vibration level is optimized to help evenly heat the food (vibration could be through motor, voice coil actuator, etc.)

User Experience
Open cover
Put single serving container in tray
Close cover
Press power button
Wait until display signals cooking complete
Open cover and remove container with perfectly cooked food
Repeat as desired

FIG. 10

POPCORN MAKER

FIELD OF THE INVENTION

The present invention relates to cooking systems that utilize a vibrating device to improve the process of food preparation. More particularly, the present invention pertains to the use of induction and vibration to cook and prepare food, including popping popcorn.

BACKGROUND OF THE INVENTION

It is well known that the quality of food is improved when it has been properly stirred or mixed during preparation. Stirring and mixing promotes even heating and cooking so that the finished product is consistently and thoroughly prepared. This is true whether the food is rice, oatmeal, meat, or popcorn. However, it is also known that the need to mix or stir food while it is being cooked is a time consuming, tiresome, and often tedious aspect of food preparation. Various attempts have been made to obviate or minimize the need for manual stirring of food while it is being cooked. These attempts include use a vibrating device to impart motion to the cooking system which causes relative movement between the system and the food being cooked as well as within the food itself.

The preparation of popcorn requires particular attention. In order to prepare a sufficient quantity of popped kernels that are uniformly cooked, the even application of heat to all of the kernels is imperative. Otherwise, some kernels pop earlier than others and become burned while the later-popping kernels continue to be heated. On the other hand, uneven heating can leave numerous kernels unpopped or only partially popped.

Many previous attempts have been made to engineer an efficient way to prepare high quality popcorn. For example, the well known Jiffy Pop® brand combines popcorn kernels and oil in a disposable aluminum pan with an expandable aluminum foil top. The Jiffy Pop® unit is heated on an electric range while the consumer continuously oscillates the unit, causing the kernels to move and mix in the pan. One obvious disadvantage of this method is the nearly constant attention that the consumer must pay to the task of shaking the disposable pan across the heat source. The Jiffy Pop® container must be continuously shaken back and forth so that the kernels are continuously mixed while being heated.

Another example is the use of a microwave oven to heat a paper package containing kernels and oil. This method has well-known problems, including wildly uneven heating of the kernels resulting in burned popcorn and many kernels remaining unpopped. The overall flavor of popcorn prepared in the microwave is also well-known to be below average.

Thus, there is also a need for a reliable system to make high quality popcorn without requiring the entirety of the consumer's attention during preparation.

SUMMARY OF THE INVENTION

It is an object of the present invention to provide a cooking system that makes high quality popcorn. It is a further object of the present invention to provide a cooking system that provides even heating to kernels of popcorn so that the kernels each pop within a narrow window of time from the others. It is a further object of the present invention to provide a cooking system that makes popcorn in a short amount of time. It is a further object of the present invention to provide a cooking system that permits easy consumption of the popcorn and easy clean up after making popcorn.

In order to at least partially achieve the forgoing and other objects, a system for popping popcorn is provided, including a housing, a container positioned in the housing, a cartridge containing unpopped popcorn kernels removably supported in the container, wherein the cartridge includes ferromagnetic material, a coil that creates an oscillating magnetic field that interacts with the ferromagnetic layer of the cartridge and generates an amount of heat in the cartridge, a vibrator coupled to the container for vibrating the container and the cartridge, and a receiving vessel for receiving popped popcorn positioned adjacent the container.

In some embodiments, the cartridge has a peel-off cover. In additional embodiments, the cartridge has a height of about half an inch. In further embodiments, the cartridge has a diameter of about 2-3 inches.

In certain embodiments, the container is formed of a thermally insulating, elastically deformable material.

In some embodiments, the cartridge contains at least one other substance in addition to unpopped popcorn kernels. In certain of these embodiments, the at least one additional substance is one of an oil, salt, spice, or flavoring.

In certain embodiments, a bottom and side walls of the cartridge create a seal between contents of the cartridge and the rest of the system.

A system for popping popcorn is also provided including a housing, a container positioned in the housing and adapted to support a cooking vessel containing unpopped popcorn kernels, a heating element adapted to generate heat in the cooking vessel, and a vibrator coupled to the container for vibrating the container, wherein the container is formed of a thermally insulating, elastically deformable material.

In some embodiments, the heating element comprises a coil for creating an oscillating magnetic field that interacts with and generates an amount of heat in the cooking vessel.

In certain embodiments, the cooking vessel is a popcorn cartridge that includes a ferromagnetic surface for interacting with the oscillating magnetic field to generate the heat in the vessel. In some of these embodiments, the popcorn cartridge is disposable. In other embodiments, the popcorn cartridge is reusable.

In some cases, the container is formed of a silicone rubber.

In some embodiments, the vibrator is coupled directly to the container. In additional embodiments, the vibrator comprises a vibrating element placed in the container, a motor positioned in the housing for generating vibrations in the vibrating element, and connector for connecting the motor with the vibrating element.

In some embodiments, the system further includes a receiving vessel for receiving popped popcorn. In certain of these embodiments, the system also includes a lid coupled to the housing, wherein the lid substantially covers the container and the receiving vessel. In additional embodiments, the lid is shaped to direct a kernel of popped popcorn from the cooking vessel to the receiving vessel.

In certain embodiments, the housing has a base and a top and the heating element is located closer to the top of the housing than the base of the housing. In some of these embodiments, the system also includes a power supply located near the housing base, wherein the heating element is connected to the power supply.

In some cases, the system further includes software for operating the heating element and the vibrator to automatically pop the popcorn.

In some embodiments, the system automatically recognizes a type of popcorn to be cooked and selects a particular pre-loaded algorithm corresponding to the type of popcorn.

Other objects of the invention and its particular features and advantages will become more apparent from consideration of the following drawings and accompanying detailed description.

BRIEF DESCRIPTION OF THE DRAWINGS

FIG. 10 shows summaries of exemplary software algorithms used in embodiments of the present invention.

DETAILED DESCRIPTION OF THE INVENTION

Figure 1:
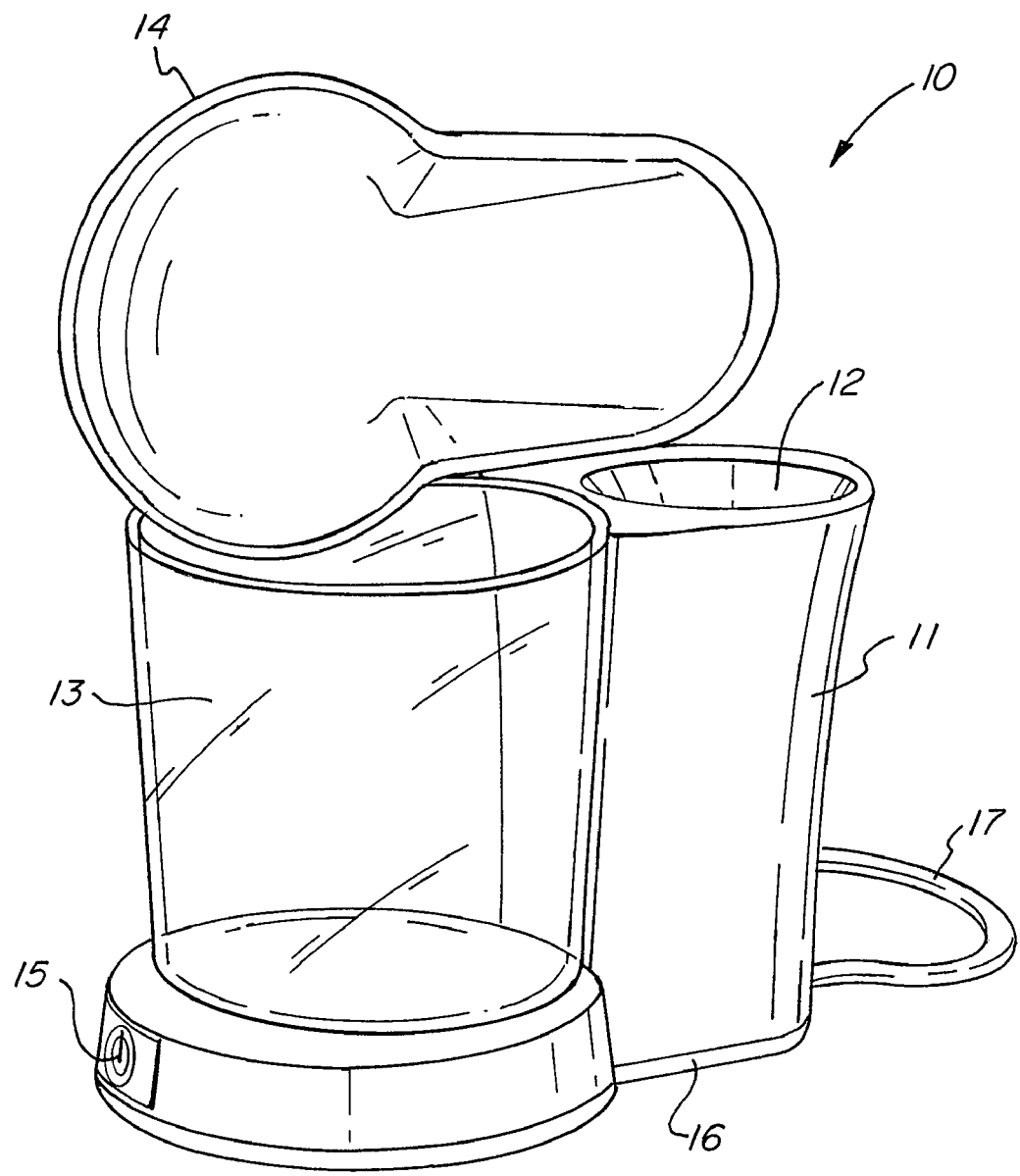
FIG. 1 is an isometric view of a system for popping popcorn according to an embodiment of the present invention.

With reference now to the drawings, embodiments of the present invention will be described. FIGS. 1-4 illustrate a system for popping popcorn 10 according to one embodiment of the present invention. It is understood, however, that the present invention is not limited to the particular design shown in these figures and that other suitable designs may be utilized.

The system 10 can be described as a stand-alone electric popcorn maker. The system 10 utilizes both induction cooking technology as well as vibration, along with various other features described below to improve the efficiency of popping popcorn and the overall quality of the finished product.

Induction cooking systems have been known for many years but have gained popularity recently due to their many advantages over other types of cooking systems. For example, like a traditional electric stove, an induction stove uses electricity to generate heat. However, instead of heating a resistive element (such as a coil of metal) by passing electric current through it, an induction stove generates an oscillating magnetic field that causes the cooking vessel itself to be heated. The term "cooking vessel," as used throughout this specification, refers to any container or hardware in which food or other material is placed to be cooked.

In an induction cooking system, a wire coil located beneath the cooking area receives an alternating electrical current, and thereby creates an oscillating magnetic field. When a cooking vessel made from a ferromagnetic material is placed in the cooking area, the oscillating magnetic field causes the ferromagnetic material to heat up. The ferromagnetic material is heated by means of magnetic hysteresis loss in the ferromagnetic material as well as by eddy currents created in the ferromagnetic material (which generate heat due to the electrical resistance of the material). The mechanisms by which an induction coil generates heat in a cooking vessel are well known to those of skill in the art.

FIGS. 1-4 show a system 10 that includes a housing 11, a container or cup 12, a receiving vessel 13, and a lid 14. The housing 11 is made with any suitable material, e.g. plastic, that is not expensive to manufacture and is easy to clean. The housing 11 has a power switch 15 located near its base 16 for turning on of the system 10 by a user. In some embodiments, the power switch 15 is lit up when it is activated to indicate the device status to the user. The user initiates the popcorn popping cycle by pushing the power switch 15. This causes the vibrator and induction coil to activate according to a program selected to optimize popping of kernels in the popcorn cartridge.

The lid 14 is connected to the housing by a hinge or any other suitable mechanism and, when the lid is in the closed position, it covers both the container 12 and the receiving vessel 13. The cup 12 is adapted to receive a cooking vessel, or cartridge, of unpopped popcorn kernels for popping. Inside the housing 11 is a heating element, which in this embodiment, is an induction coil and a vibrator that is coupled to the container 12. A power cord 17 is connected to a power supply unit also inside the housing 11 and can be plugged into a wall outlet for obtaining electrical power. The heating element and the vibrator obtain power from the power supply unit.

Figure 2:
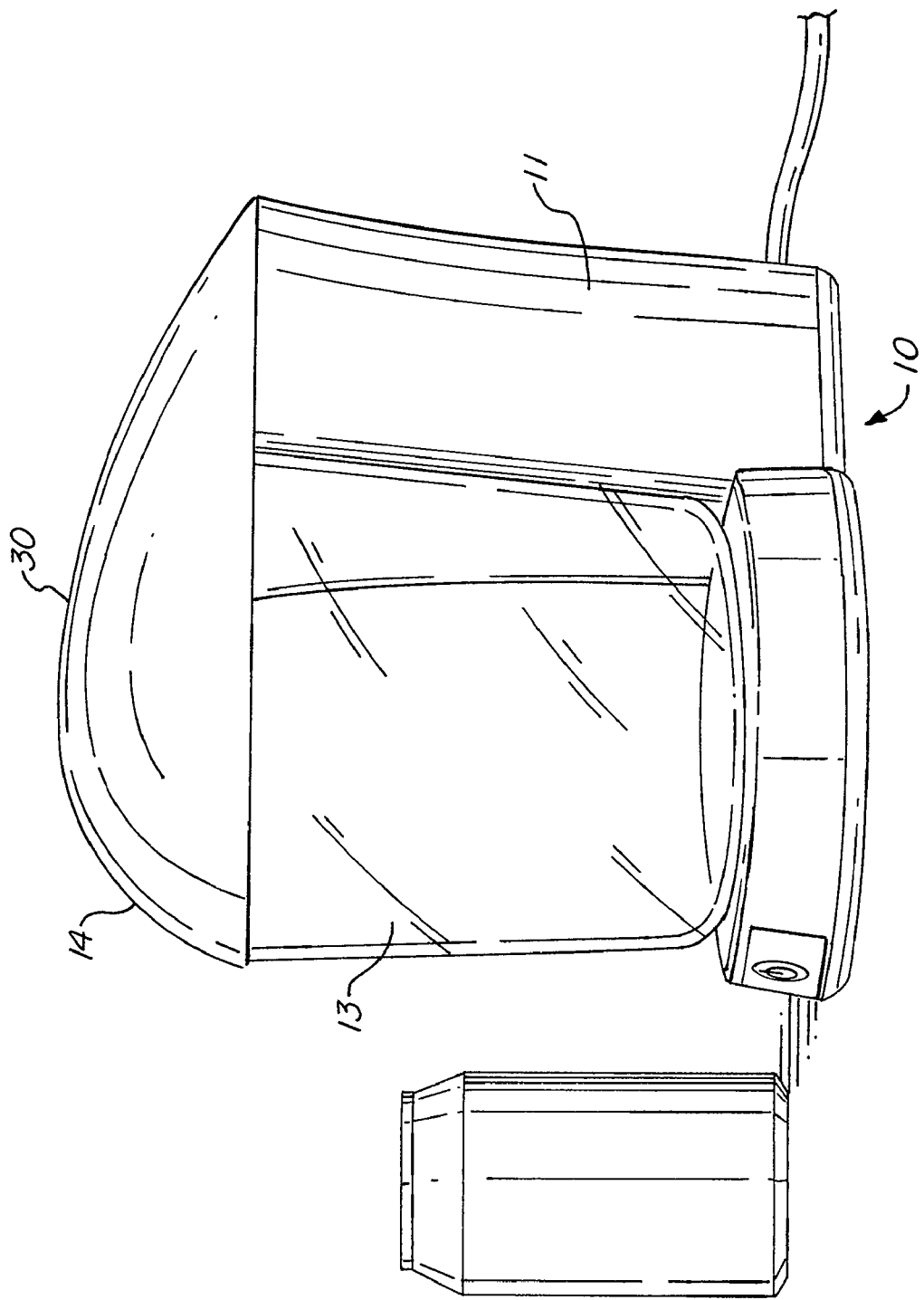
FIG. 2 is a side view of the system of FIG. 1.

FIG. 2 shows the system 10 with the lid 14 in the closed position. The lid 14 is sloped in such a way that, when popcorn kernels are popped, the popped kernels bounce off of the lid 14 and land in the receiving vessel 13. As is known in the art, the energy released when a popcorn kernel that is resting on a surface is popped, will generally cause the kernel to be propelled upwards from the surface. The lid shown in the drawings causes the system to utilize this propulsion of the popping kernels to direct the kernels into the receiving vessel 13. The vessel 13 is removable from the housing 11 so that the user can easily consume the popped popcorn, wash the container, and use it again for another batch of popcorn. In some embodiments, the receiving vessel 13 is transparent such that the user can view the progress of the popcorn popping process. In additional embodiments, the lid 14 is transparent or semi-transparent.

Figure 3:
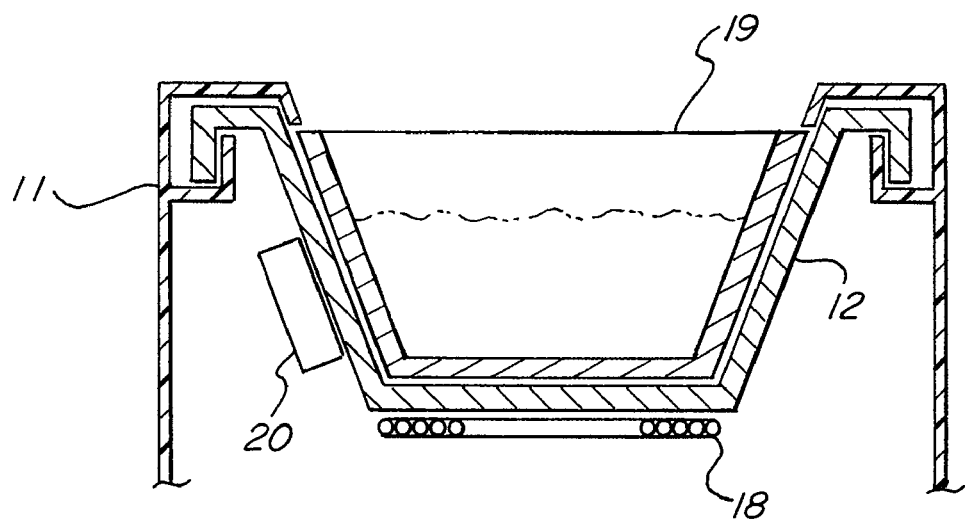
FIG. 3 is a cross-section view of a portion of the system of FIG. 1.
Figure 4:
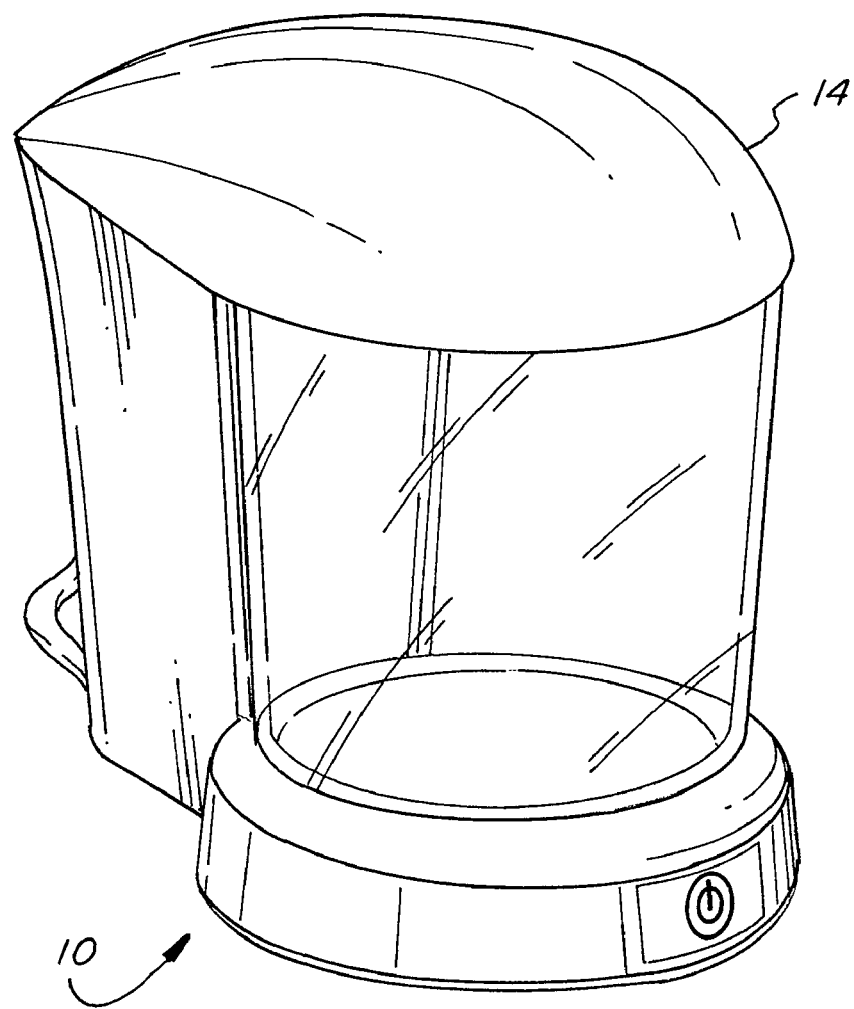
FIG. 4 is an isometric view of the system of FIG. 1, showing the lid in closed position.

FIG. 3 illustrates a cross section view of the upper portion of the housing 11 of the system 10. The container or cup 12 is shaped to receive a popcorn cartridge or other cooking vessel 19. Beneath it is a heating element, in this case an induction coil 18, that generates heat in the cartridge or other cooking vessel 19. Heat is generated by virtue of the fact that the cartridge or vessel 19 includes at least some ferromagnetic material. A vibrator 20 is coupled to the container 12. The vibrator 20 imparts oscillating movement to the container and, thereby, the cartridge or other cooking vessel 19. This causes the popcorn (or other food) to be mixed while being heated.

Advantageously, the induction coil 18 is located in the upper section of the housing 11. This way, the coil 18 is remote from the power supply unit of the system, which is located near the base 16, to prevent any potential overheating issues.

In the embodiment shown in the figures, the container 12 is formed of high-temperature silicone. The container 12 seals the top of the housing to prevent spills of the contents of the cartridge 19, e.g. oil. The high-temperature silicone container 12 also insulates the cooking system, and particularly the induction coil, from heat generated in the cartridge or vessel 19. The elasticity of the container 12 also isolates the system from the vibrations created by the vibrator. This helps prevent wear on parts of the system and unwanted loosening of various fasteners used throughout. It is understood that the container 12 may be manufactured out of any other suitable thermally insulating, elastically deformable material.

Figure 5A:
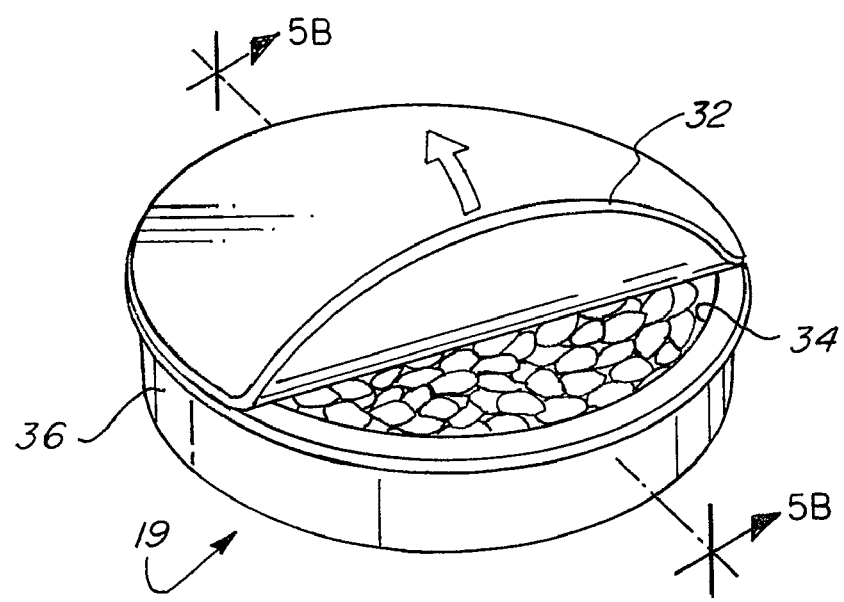
FIGS. 5A and 5B illustrate one exemplary embodiment of a cartridge for use with embodiments of the present invention.
Figure 5B:
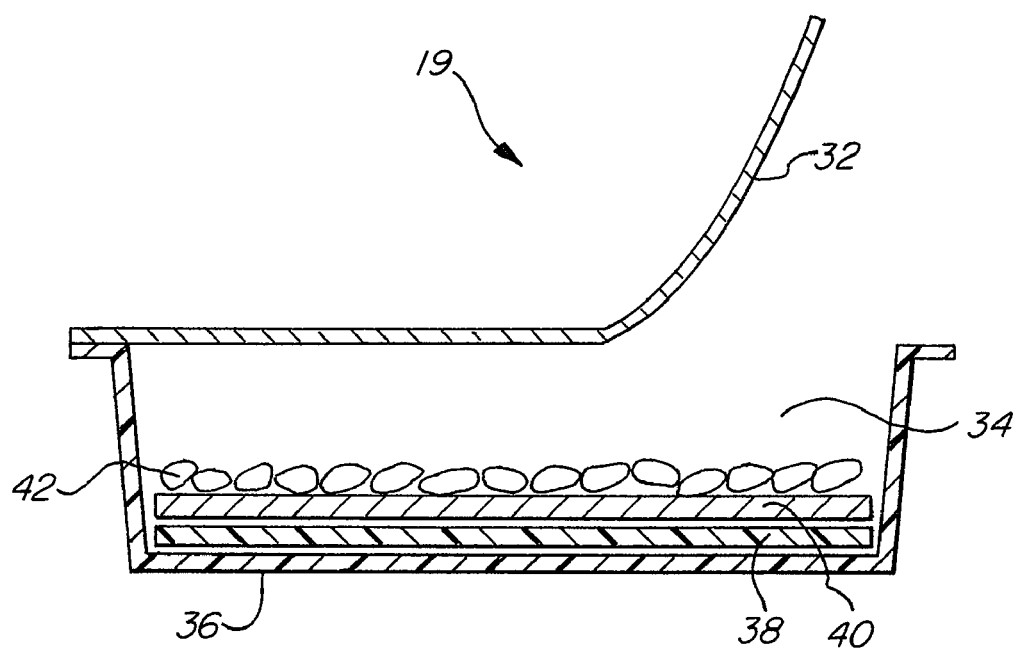

The popcorn cartridge 19 is, in some embodiments, a disposable cartridge similar to Keurig's K-Cup®, such as shown in FIGS. 5A and 5B. The cartridge 19 has a body 36 with an inner cavity 34 that contains unpopped popcorn kernels 42 and any other desirable substance, such as salt, spices, oil and/or flavorings. The cartridge also has a lid 32 that may be peeled-off or otherwise removed before the cartridge is placed in the system. The popcorn cartridge 19 for use with the present invention includes a ferromagnetic material for interacting with the induction coil 18. As shown in FIG. 5B, the cartridge 19 includes a ferromagnetic layer 40 positioned in the cavity 34. The cartridge 19 can also include an intermediate layer 38 made with any suitable thermally insulating material, such as silicone, that functions to thermally isolate the ferromagnetic layer 40 from the rest of the system. In additional embodiments, the lower surface as well as the side surface of the cartridge 19 are made of a ferromagnetic material to permit maximum heating.

The cartridge is completely sealed off during storage such that none of the contents can spill out. Once the lid is removed and the cartridge is placed into the system 10, only the top of the cartridge is open such that only popped popcorn can escape the cartridge by being propelled out from the open top of the cartridge. The unpopped kernels and other contents of the cartridge, such as oil, spices or flavoring, cannot exit the cartridge from the bottom or side walls and contaminate the rest of the system.

In some advantageous embodiments, the cartridge 19 is sized such that it accommodates a single layer of unpopped kernels 42 (approximately 1 oz of kernels), but is small enough such that the popped popcorn cannot fall back into the cartridge but instead is propelled into the receiving vessel 13. In certain advantageous embodiments, the cartridge 19 is about 2-3 inches in diameter and about half an inch in height. The cartridge 19 may also contain an oil layer, which will typically be hardened/thickened during storage thereby holding the unpopped kernels in place. Once the cartridge in placed in the system 10 and heated, the oil will soften and the final popped popcorn will be mixed with oil to improve taste. After the popping process is completed, the cartridge is removed from the system, e.g. by grabbing the two sides of the cartridge to lift it up, and discarded.

Figure 6A:
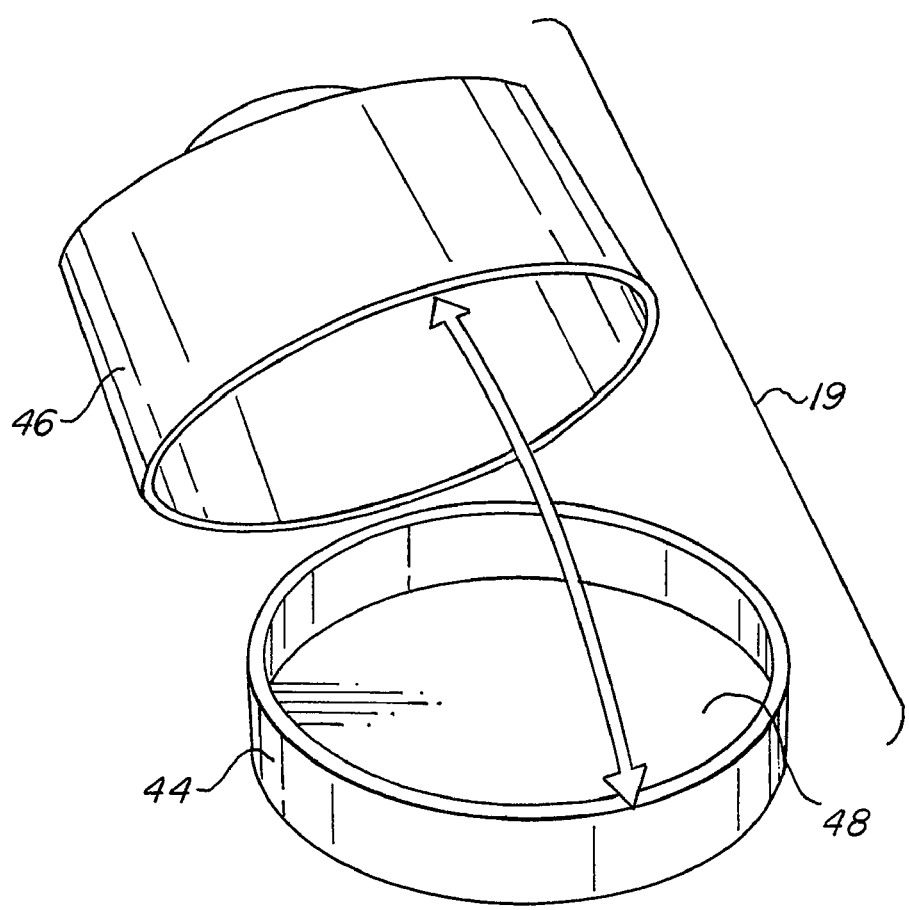
FIGS. 6A and 6B illustrate another exemplary embodiment of a cartridge for use with embodiments of the present invention.
Figure 6B:
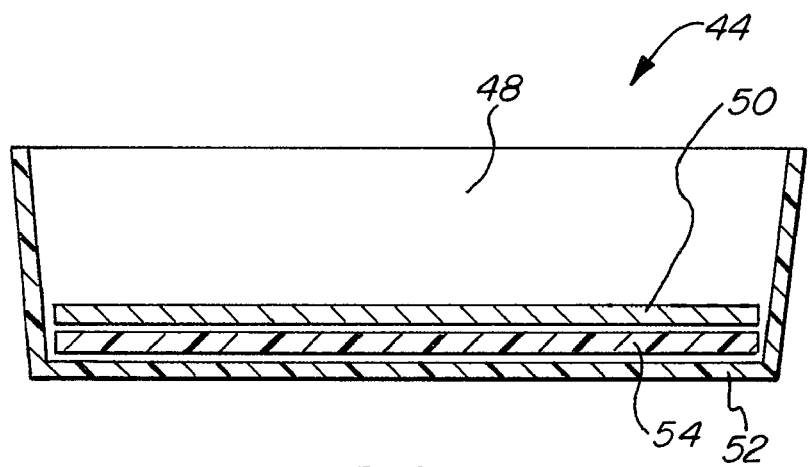

The present invention will also accept non-disposable cooking vessels, such as trays or cups, that a user can reuse for cooking popcorn or other foods. Again, such cooking vessels must contain some ferromagnetic material and fit suitably well in the container 12. One example of such cooking vessel is illustrated in FIGS. 6A and 6B. In this embodiment, the cooking vessel 19 has a body 44 with a cavity 48 for holding unpopped popcorn kernels, and a removable lid 46. The cavity 48 has a ferromagnetic layer 50 positioned on its bottom. The ferromagnetic material may also be used for the bottom and/or side walls of the body 44. A thermally insulating layer 54 may also be placed under the ferromagnetic layer 50. The unpopped kernels are placed into the cavity 48 prior to activation of the system 10. In some embodiments, the removable lid 46 is sized such that it can receive the popped popcorn, in which case the system may not utilize a receiving vessel 13. In this embodiment, the kernels will pop and will be contained in the vessel 19 by the lid 46. Once the popping process is completed, the user may remove the vessel 19 from the system and open the lid to access the popper popcorn. The vessel is then cleaned and may be reused in the future.

The oscillations generated by the vibration device 20 assist in dispersing the kernels across the bottom of the cartridge 19. This ensures that a higher percentage of the kernels pop, leaving very little unpopped product behind. Several exemplary embodiments of the vibration devices are illustrated in FIGS. 7A-7C, 8A-8C, and 9A-9C.

Figure 7A:
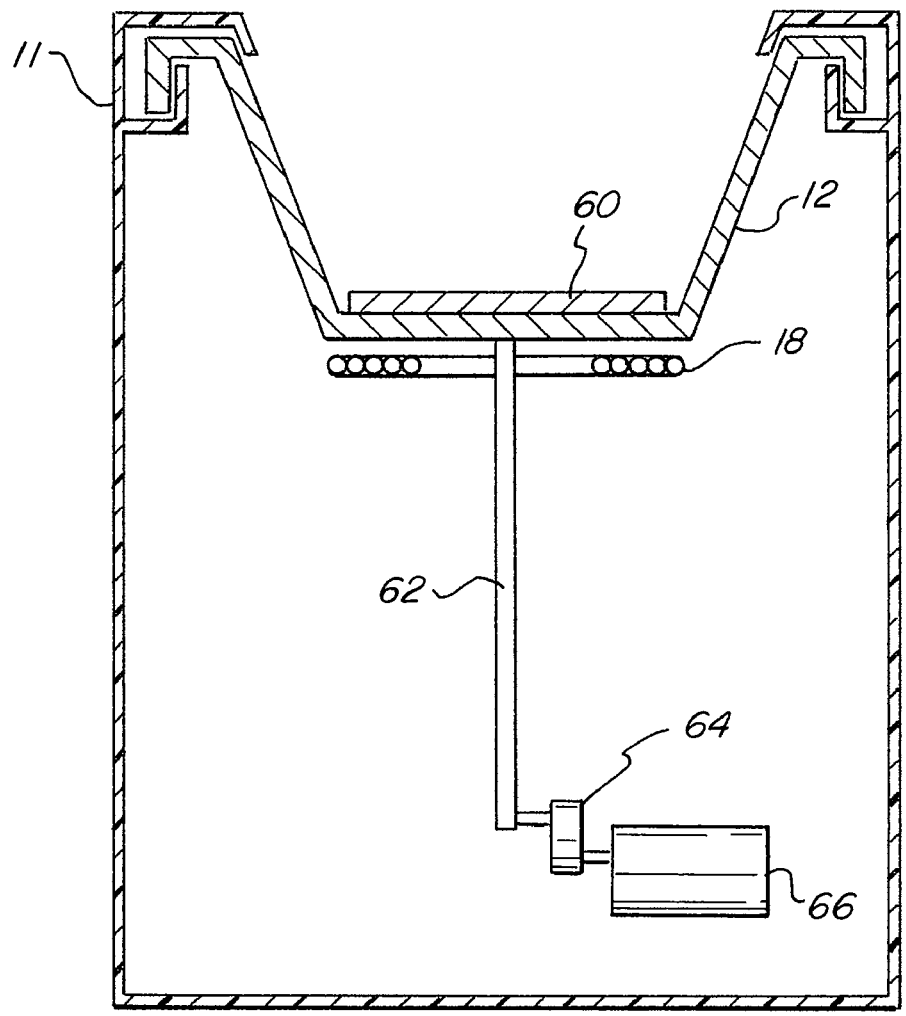
FIGS. 7A-7C illustrate a first exemplary embodiment of a vibration system for use with embodiments of the present invention.
Figure 7B:
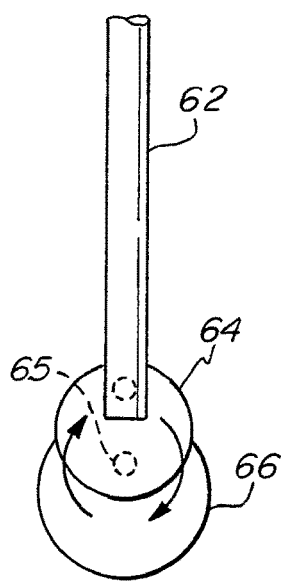
Figure 7C:
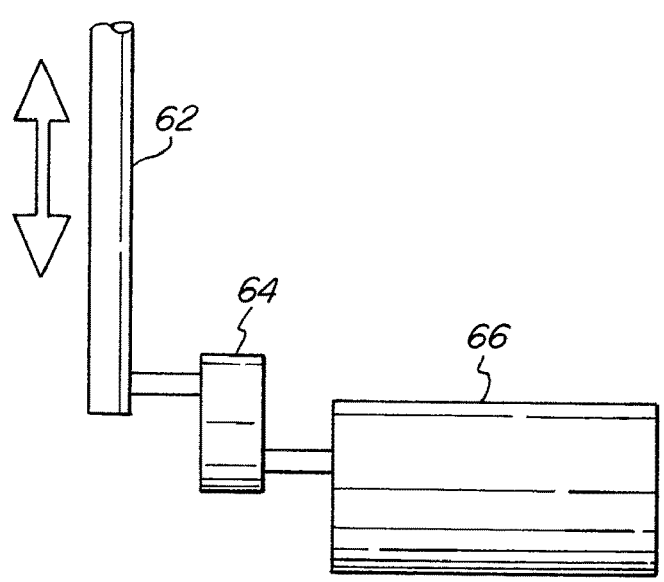

In the embodiment shown in FIGS. 7A-7C, the vibration device includes a vibration element 60, such as a disk, placed on the bottom of the container 12. The disk 60 oscillates and transfers oscillations to the cartridge placed in the container 12. The disk is made with any suitable material. In some embodiments, the disk is made with a non-ferrous material, such as plastic, and functions primarily to transfer vibrations to the cartridge. In additional embodiments, the disk is made with a ferromagnetic material, such as magnetic stainless steel, that interacts with the induction coil and provides additional heating to the kernels inside the cartridge 19.

There is also a motor mechanism that generates oscillations that are transferred to the disk 60 via a connecting rod 62 that connects the motor with the disk. The connecting rod 62 is preferably made with a non-ferrous material such that it does not become heated by the induction coil 18. In the example shown in these figures, the motor comprises a stationary motor 66 coupled to an eccentric crank 64, which is in turn coupled to the connecting rod 62, as shown in FIG. 7C. Any suitable type of vibration motor may be used. The actuation of the motor 66 causes the crank 64 to rotate on axis pin 65, which causes the connecting rod 62 to move in an up and down motion, thus creating oscillations that are transferred to the cartridge 19.

Figure 8A:
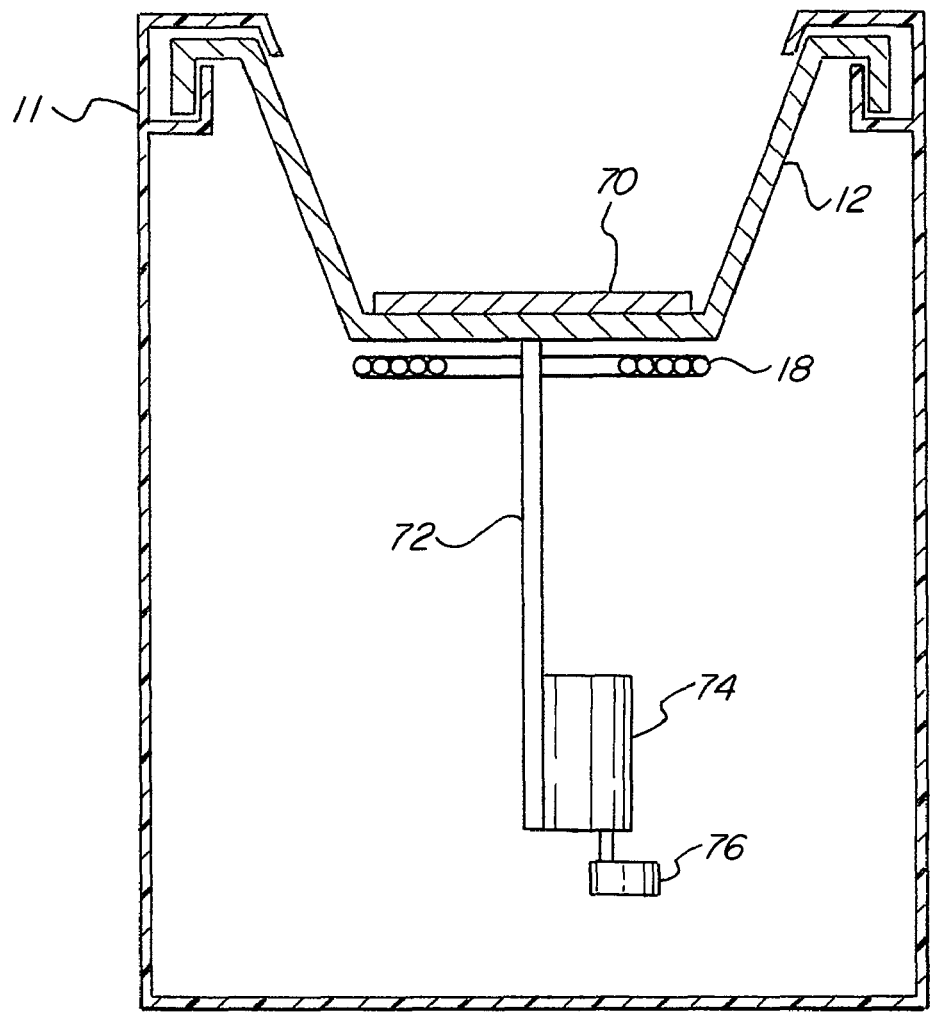
FIGS. 8A-8C illustrate a second exemplary embodiment of a vibration system for use with embodiments of the present invention.
Figure 8B:
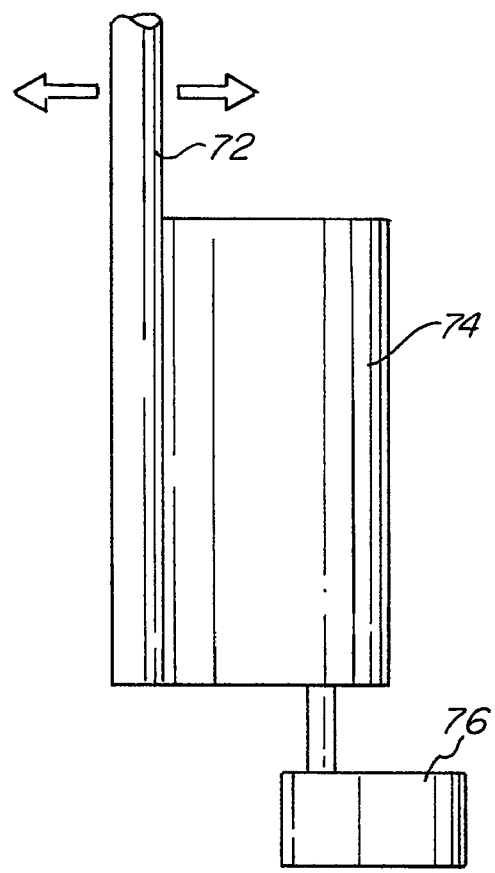
Figure 8C:
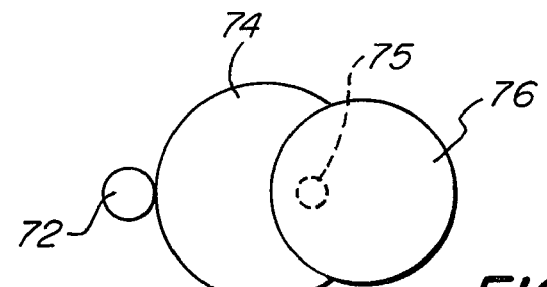

The vibration system shown in FIGS. 8A-8C is similar to the system shown in FIGS. 7A-7C. However, in this embodiment, the vibration motor 74 is coupled directly to the connecting rod 72. The vibration device also includes a counter weight 76 coupled to the motor 74. Rotation of the counter weight 76 on an axis pin 75 causes the motor 74 with the coupled connecting rod 72 to move in a side to side motion, as shown in FIGS. 8B and 8C, which in turn causes the disk 70 placed in the container 12 to oscillate.

Figure 9A:
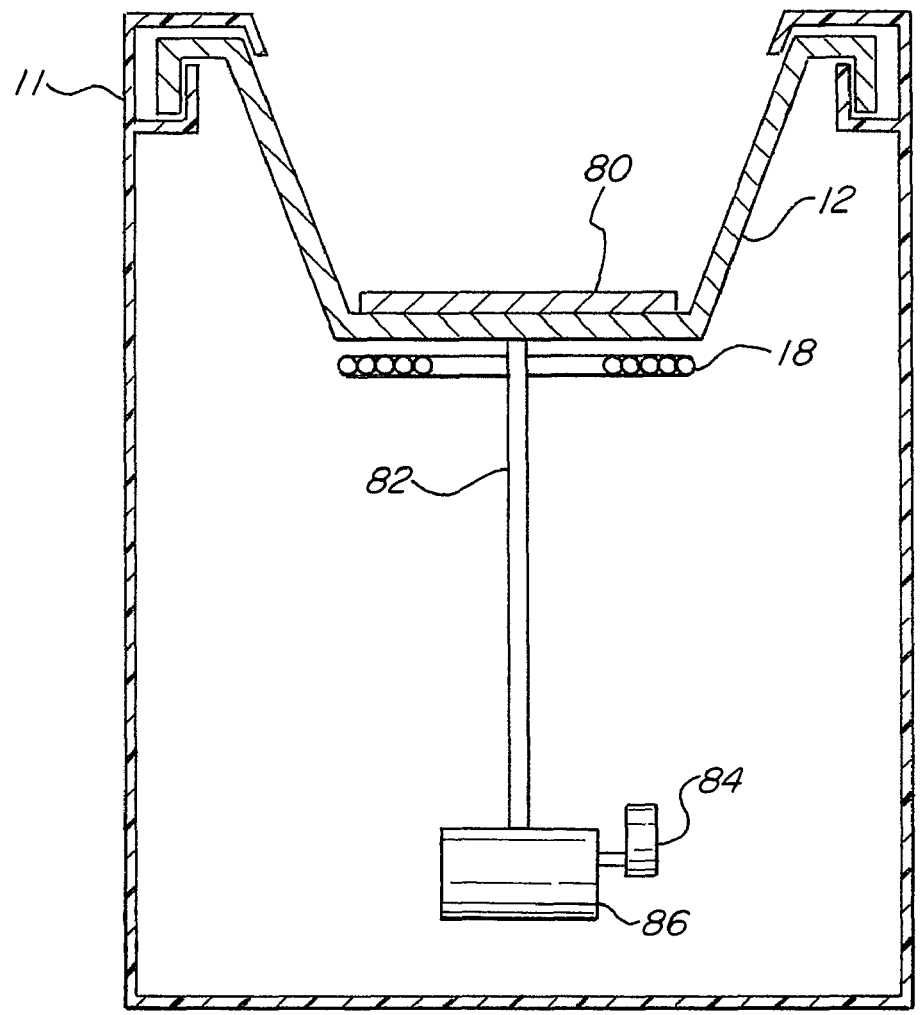
FIGS. 9A-9C illustrate a third exemplary embodiment of a vibration system for use with embodiments of the present invention.
Figures 9B, 9C:
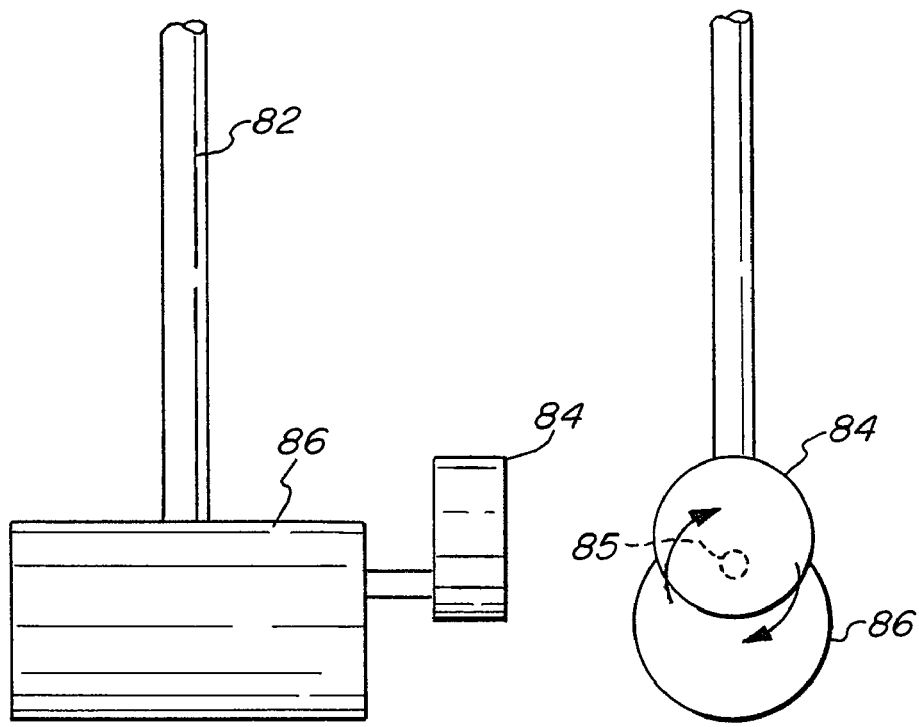

In the embodiment shown in FIGS. 9A-9C, the motor 86 is coupled to the connecting rod 82 and is also coupled to a counter weight 84. The coupling between the motor and the other components is such that the rotation of the counter weight 84 on an axis pin 85 causes the connecting rod 82 to move in an up and down motion, which is transmitted to the disk 80 positioned in the container 12.

In some embodiments, the system includes software programming that will cause the heating element 18 and the vibrator 20 to be operated to properly cook popcorn or other food automatically. For example, unpopped popcorn kernels are provided in a predetermined serving size along with the appropriate amount of cooking oil and other flavorings (such as spices etc.). In some embodiments, these ingredients are intended to be loaded into a non-disposable cooking tray 19 that includes a ferromagnetic material for interacting with the induction coil, as described above. The system has a software algorithm that is preprogrammed to apply the ideal amount of cooking power, for the ideal amount of time, and at the ideal level of vibration to optimally pop the predetermined serving size of popcorn.

The induction coil is driven at the necessary frequency and with the necessary input voltage and current to obtain the desired cooking power level. In some embodiments, for example, the coil is driven at frequencies between 19 KHz and 59 KHz. The power level is adjusted along a precise curve over the cooking time to optimize the popping. At the same time, the algorithm selects the vibration level to help evenly heat the kernels. Thus, the system software operates the induction coil and the vibrator at the appropriate levels over the necessary cooking time to provide optimally popped popcorn.

The system software described above provides a simplified user experience. The user first opens the lid 14, then places the ingredients in a cooking vessel 19, which is then placed in the container 12, and then closes the lid. The user then simply presses the power button 15 and waits for the system to signal that popping is complete. The user the opens the lid again and removes the receiving vessel 13 containing the popped popcorn.

In other embodiments, food is supplied in prepackaged containers designed specifically for automatic cooking in the system 10. One example, also discussed above, is a cartridge with unpopped popcorn kernels, cooking oil, and flavorings contained therein. The cartridge includes a ferromagnetic material for interacting with the induction coil. In some embodiments, each cartridge has a machine readable ID that the system 10 reads to determine which cooking algorithm to use. Different foods require different power level profiles, cooking times, and vibration levels, so the system 10 has multiple preloaded cooking algorithms. Once the cartridge is recognized by the system 10, the algorithm operates the coil and vibrator to cook the food.

The system also provides a simplified user experience. Because of the automatic food-type recognition feature, only a single button is required to initiate the automatic cooking. In the case of a prepackaged popcorn cartridge, the popped popcorn will be deposited in the container. For other types of food, the cooked food will remain in the prepackaged container and the user simply removes it from the container 12 and serves it. A summary of two exemplary software algorithms is provided at FIG. 10.

It should be understood that the foregoing is illustrative and not limiting, and that obvious modifications may be made by those skilled in the art without departing from the spirit of the invention. Accordingly, reference should be made primarily to the accompanying claims, rather than the foregoing specification, to determine the scope of the invention.

What is claimed is:

1. A system for popping popcorn, comprising:
a housing,
a container positioned in the housing,
a cartridge containing unpopped popcorn kernels removably supported in the container, wherein the cartridge includes ferromagnetic material,
a coil that creates an oscillating magnetic field that interacts with the ferromagnetic material of the cartridge and generates an amount of heat in the cartridge,
a vibrator coupled to the container for vibrating the container and the cartridge, and
a separate receiving vessel for receiving popped popcorn positioned adjacent the container, wherein the receiving vessel is configured to move relative the cartridge.

2. The system of claim 1, wherein the cartridge has a peel-off cover.

3. The system of claim 1, wherein the cartridge has a height of about half an inch.

4. The system of claim 1, wherein the cartridge has a diameter of about 2-3 inches.

5. The system of claim 1, wherein the container is formed of a thermally insulating, elastically deformable material.

6. The system of claim 1, wherein the cartridge contains at least one other substance in addition to unpopped popcorn kernels.

7. The system of claim 6, wherein the at least one additional substance is one of an oil, salt, spice, or flavoring.

8. The system of claim 1, wherein a bottom and side walls of the cartridge create a seal between contents of the cartridge and the rest of the system.

9. The system of claim 1, wherein the cartridge is disposable.

10. The system of claim 1, wherein the cartridge is reusable.

11. The system of claim 1, wherein the container is formed of a silicone rubber.

12. The system of claim 1, wherein the vibrator is coupled directly to the container.

13. The system of claim 1, wherein the vibrator comprises a vibrating element placed in the container, a motor positioned in the housing for generating vibrations in the vibrating element, and connector for connecting the motor with the vibrating element.

14. The system of claim 1, further comprising a lid coupled to the housing, wherein the lid substantially covers the container and the receiving vessel.

15. The system of claim 14, wherein the lid is shaped to direct a kernel of popped popcorn from the cooking vessel to the receiving vessel.

16. The system of claim 1, wherein the housing has a base and a top and a heating element located closer to the top of the housing than the base of the housing.

17. The system of claim 16, further comprising a power supply located near the housing base, wherein the heating element is connected to the power supply.

18. The system of claim 16, further comprising software for operating the heating element and the vibrator to automatically pop the popcorn.

19. The system of claim 1, wherein the system automatically recognizes a type of popcorn to be cooked and selects a particular pre-loaded algorithm corresponding to the type of popcorn.

20. A system for popping popcorn, comprising:
a housing,
a container positioned in the housing,
a cartridge containing unpopped popcorn kernels removably supported in the container,
a heating element adapted to generate heat in the cartridge,
a vibrator coupled to the container for vibrating the container, and
a separate receiving vessel for receiving popped popcorn positioned adjacent the container, wherein the receiving vessel is configured to move relative the cartridge.

21. A system for popping popcorn, comprising:
a housing,
a container positioned in the housing,
a cooking vessel removably supported in the housing and containing unpopped popcorn kernels,
a heating element adapted to generate heat in the cooking vessel,
a vibrator coupled to the cooking vessel for vibrating the cooking vessel, a separate receiving vessel for receiving popped popcorn positioned adjacent the cooking vessel, wherein the receiving vessel is configured to move relative the cooking vessel, and a lid that covers both the cooking vessel and the receiving vessel, wherein the lid is configured to open to allow access to the cooking vessel.

\* \* \* \* \*